Patented Oct. 30, 1934

1,978,433

UNITED STATES PATENT OFFICE 1,978,433

PROCESS FOR PREPARING PARA-SEC-ALKYLAMINO-PHENOLS

Randolph T. Major, Westfield, N. J., assignor to Merck & Co., Inc., Rahway, N. J., a corporation of New Jersey No Drawing. Application March 23, 1931, Serial No. 524,765

11 Claims. (Cl. 260—128)

This invention relates to the manufacture of certain new para-(N-sec-alkylamino)phenols and other substituted phenols and their salts used largely as photographic developers and fur dyes, and to improvements in processes of making these groups of compounds generally.

Para-isopropylamino-phenol has been prepared by Buc, U. S. Patent 1,555,452, September 29, 1925, by the interaction of isopropyl chloride and p-aminophenol.

I have found that the preparation of para-(N-sec-alkylamino)phenols in general may conveniently and relatively cheaply be obtained in very pure form by the reduction of p-nitro-phenols or p-nitroso-phenols in solution in dialkyl ketones (with or without the presence of an inert polar solvent such as alcohol) by hydrogen in the presence of a metallic catalyst such as platinum, palladium or nickel, the last under 50 atmospheres pressure at 100° C. as described by Komatsu and Amatatsu, Mem. Coll. Sci. Kyoto Imp. Uni. Ser. A 13,329 (1930); C. A. 25,500 (1931).

In the process thus carried out para-aminophenol is also concurrently formed and appears as an impurity which can, however, be readily removed from the alkylamino-phenol by combining the aminophenol with aldehydes according to known methods. A convenient method for accomplishing the separation of the aminophenol is as follows:

An aqueous solution of the mixture of p-alkylamino-phenol and p-aminophenol in a weak acid is shaken with an aromatic aldehyde. The condensation product between the aldehyde and the p-aminophenol is removed. Excess of the aldehyde is removed by heat or an inert solvent. The remaining solution contains the salt of the purified p-alkylamino-phenol. The free base may be obtained by means of alkalies.

These alkylamino-phenol preparations after purification may readily be converted into soluble salts, for example the sulfuric acid addition salt or hydrochloride. These salts of p-(N-sec-alkylamino-phenols are white, crystalline compounds, readily soluble in water and are highly desirable for use as photographic developers and for hair dyes.

The following examples will illustrate preferred methods of applying my invention:

Example I.—25.2 grams of p-nitrophenol is dissolved in an excess of acetone at room temperature. To this solution is then added 0.2 of a gram of a platinum catalyst prepared preferably according to the method of Adams and Shriner, J. Am. Chem. Soc. 45,2171 (1923). The mixture is shaken in an atmosphere of hydrogen at room temperature until the calculated amount of hydrogen has been absorbed. After the catalyst has been filtered off, the residue of acetone is distilled off in vacuo. The remaining material is then dissolved in dilute acetic acid. More than sufficient benzaldehyde is then added to combine with all the p-aminophenol formed during the reaction period. The mixture is vigorously shaken for half an hour. This is then extracted with ether. The aqueous layer is made neutral with sodium carbonate. The p-(N-isopropyl-amino)phenol which precipitates out is filtered off, and recrystallized from benzene. It is obtained in the form of white, needle-like crystals, soluble in dilute acids and alkalies, and in ether and alcohol, and insoluble in water, having a melting point of 155–156° C.

Example II.—12.3 grams of para-nitrophenol is added to a solution 14.6 grams of methyl ethyl ketone and 20 cubic centimeters of methyl alcohol. To this solution is then added 0.2 gram of platinum catalyst as in Example I. After the mixture has been shaken in an atmosphere of hydrogen and has absorbed the required amount of hydrogen, it is treated in the same way as was described in Example I for the preparation of the p-isopropylaminophenol, except that the p-(N-sec-butyl-amino)phenol, thus obtained in this process, is recrystallized from toluene. The butyl compound is in the form of white crystals soluble in acids and alkalies, alcohol, and ether, and insoluble in water, and has a melting point of 118–119° C. Its hydrochloride is soluble in water, insoluble in ether, and decomposes without melting when heated.

Example III.—12.3 grams of para-nitrosophenol is dissolved in acetone at room temperature. To this solution is then added 0.2 gram of the platinum catalyst mentioned in Example I. After the mixture has absorbed the required amount of hydrogen it is treated in the same way as was described in Example I. The para-isopropyl-aminophenol melts at 155–156° C.

In the foregoing examples my method has been shown with the use of para-nitrophenol and para-nitrosophenol, but I find that I am not limited to these precise forms, but may use quite satisfactorily in their place suitable carbon substituted derivatives of these.

Having thus set forth the manner and means of carrying out this invention, I request the issuance of Letters Patent on the following claims:

1. p(N-sec-butyl-amino)phenol in the form of white crystals, soluble in acids and alkalies, alcohol, and ether, and insoluble in water, and having a melting point of 118–119° C., and whose hydrochloride is soluble in water, insoluble in ether, and decomposes without melting when heated.

2. In a process of making p(N-sec-alkyl-amino)phenols, the step of reducing p-nitrophenols in the presence of dialkyl ketones.

3. In a process of making p(N-sec-alkyl-amino)phenols, the step of reducing p-nitrophenols in the presence of dialkyl ketones with the aid of a hydrogenation catalyst.

4. In a process of making p(N-sec-alkyl-amino)phenols, the step of reducing p-nitrophenols in the presence of dialkyl ketones with the aid of platinum as a catalyst.

5. In a process of making p(N-isopropyl-amino)phenol, the step of reducing p-nitrophenol in the presence of acetone.

6. In a process of making p(N-isopropyl)-amino-phenol, the step of reducing p-nitrophenol in the presence of acetone with the aid of a hydrogenation catalyst.

7. In a process of making p(N-isopropyl-amino)phenol, the step of reducing p-nitrophenol in the presence of acetone with the aid of platinum as a catalyst.

8. In the process of making p(N-sec-butyl-amino)phenol, the step of reducing p-nitro-phenol in the presence of methyl-ethyl ketone.

9. In a process of making p(N-sec-butyl-amino)phenol, the step of reducing p-nitro-phenol in the presence of methyl-ethyl ketone with the aid of a hydrogenation catalyst.

10. In a process of making p(N-sec-butyl-amino)phenol, the step of reducing p-nitro-phenol in the presence of methyl-ethyl ketone with the aid of platinum as a catalyst.

11. The process of making p(N-sec-butyl-amino)phenol comprising the addition of para-nitrophenol to a solution of methyl-ethyl ketone and methyl alcohol, adding a metal hydrogenation catalyst, shaking the mixture in an atmosphere of hydrogen until the required amount of hydrogen has been taken up; filtering off the catalyst and distilling off the residue of acetone in vacuo; dissolving the remaining material in dilute acetic acid; adding more than sufficient benzaldehyde to combine with all the p-amino-phenol formed during the reaction period; shaking this mixture and thereafter extracting with ether; neutralizing the aqueous layer resulting with sodium carbonate; and then filtering off the formed p(N-sec-butyl-amino)phenol and re-crystallizing the same from toluene.

RANDOLPH T. MAJOR.